US006451426B2

(12) United States Patent
Kong et al.

(10) Patent No.: US 6,451,426 B2
(45) Date of Patent: *Sep. 17, 2002

(54) SEALABLE FILM

(75) Inventors: Dan-Chang Kong, Fairport; Robert G. Peet, Pittsford; Leland L. Liu, Fairport; Michael J. Caputo, Rochester, all of NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/727,225

(22) Filed: Nov. 29, 2000

Related U.S. Application Data

(63) Continuation of application No. 08/788,551, filed on Jan. 24, 1997, now Pat. No. 6,231,975.

(51) Int. Cl.$^7$ .............................. B32B 7/06; B32B 27/32
(52) U.S. Cl. .................... 428/355 EN; 428/355 AC; 428/447; 428/516; 428/520; 428/910
(58) Field of Search .................... 428/516, 355 EN, 428/355 AC, 447, 520, 910

(56) References Cited

U.S. PATENT DOCUMENTS

| 4,291,085 A | 9/1981 | Ito et al. ..................... 428/215 |
| 4,313,996 A | 2/1982 | Newman et al. ............. 428/215 |
| 4,565,738 A | 1/1986 | Purdy ........................ 428/349 |
| 4,755,402 A | 7/1988 | Oberle ........................ 428/35 |
| 4,784,885 A | 11/1988 | Carespodi ................. 428/36.8 |
| 4,801,486 A | 1/1989 | Quacquarella et al. ..... 428/34.9 |
| 4,881,649 A | 11/1989 | Hsu et al. .................... 206/634 |
| 4,898,787 A | 2/1990 | Min et al. .................... 428/480 |
| 4,937,139 A | 6/1990 | Genske et al. ............... 428/349 |
| 4,983,447 A | 1/1991 | Crass et al. .................. 428/216 |
| 5,061,532 A | 10/1991 | Yamada ..................... 428/35.7 |
| 5,062,569 A | 11/1991 | Hekal ....................... 229/3.5 R |
| 5,116,651 A | 5/1992 | Katsura et al. ............. 428/35.7 |
| 5,160,767 A | 11/1992 | Genske et al. ........... 428/35.98 |
| 5,206,075 A | 4/1993 | Hodgson, Jr. ............... 428/216 |
| 5,319,910 A | 6/1994 | Takata et al. .................. 53/412 |
| 5,326,625 A | 7/1994 | Schuhmann et al. ........ 428/215 |
| 5,358,792 A | 10/1994 | Mehta et al. ................. 428/516 |
| 5,482,780 A | 1/1996 | Wilkie et al. ................ 428/515 |
| 5,500,265 A | 3/1996 | Ambroise et al. ............. 428/41 |
| 5,773,136 A | 6/1998 | Alder et al. ............. 428/307.3 |
| 6,231,975 B1 * | 5/2001 | Hong et al. ........... 428/355 EN |

FOREIGN PATENT DOCUMENTS

WO          96/04178          2/1996

OTHER PUBLICATIONS

Encyclopedia of Polymer Science and Engineering, vol. 6, p. 385, (1985).*

* cited by examiner

Primary Examiner—D. Lawrence Tarazano
(74) Attorney, Agent, or Firm—Dennis P. Santini; Rick F. James

(57) ABSTRACT

A sealable film comprises:
(a) an inner layer comprising an olefin polymer;
(b) a sealing layer; and
(c) a separable layer positioned between the inner layer and the sealing layer, the separable layer comprising (1) ethylene-propylene block copolymer or (2) a blend of polyethylene and another olefin which is incompatible with the polyethylene, specifically either (i) polypropylene homopolymer or (ii) ethylene-propylene block copolymer. Methods of making the sealable film are described.

7 Claims, No Drawings

SEALABLE FILM

RELATED APPLICATION

This application is continuation of U.S. application Ser. No. 08/788,551, which was filed on Jan. 24, 1997, now U.S. Pat. No. 6,231,975 B1.

FIELD OF THE INVENTION

The invention relates to a thermoplastic film which is peelable and sealable. More specifically, the invention relates to a thermoplastic film with a separable layer sandwiched between an inner layer and a sealing layer which permits peeling of the inner layer from the seal layer.

BACKGROUND OF THE INVENTION

A peelable film structure is described in WO 96/04178 published on Feb. 15, 1996. The film structure comprises (a) a core layer comprising an olefin polymer and a heat sealable layer comprising a blend of low density polyethylene (LDPE) and a material incompatible with the LDPE, such as an olefin polymer or co- or terpolymer of ethylene, propylene or butene. The film structure can be heat sealed to a plastic container to form the lid of the container, or to itself to form a package. It is disclosed that when used with a plastic container, the film structure can be readily peeled from the container in order to open it.

In U.S. Pat. No. 5,358,792 a heat sealable composition is described comprising (a) from about 30 to about 70 weight percent of a low melting polymer comprising a very low density ethylene based copolymer defined by a density in the range of about 0.88 g/cm$^3$ to about 0.915 g/cm$^3$, a melt index in the range of about 1.5 dg/min to about 7.5 dg/min, a molecular weight distribution (M$_w$M$_n$) no greater than about 3.5 and (b) from about 70 to about 30 weight percent of a propylene based polymer.

SUMMARY OF THE INVENTION

This invention relates to a sealable film comprising:
(a) an inner layer comprising an olefin polymer;
(b) a sealing layer; and
(c) a separable layer positioned between the inner layer and sealing layer, the separable layer comprising an ethylene-propylene copolymer or a blend of polyethylene and another olefin which forms an incompatible mixture or blend. The sealed film can be unsealed by causing the sealing layer to separate from the inner layer without substantially impacting the integrity of either the sealing layer or the inner layer. In one embodiment, the olefin which forms an incompatible blend with the polyethylene comprises an olefin polymer selected from the group consisting of an olefin homopolymer, copolymer or terpolymer. The invention further relates to a method of making the sealable and peelable film.

The sealable layer can be coated with a sealable coating, such as a heat sealable coating. Examples of the heat sealable coating are acrylic, ethylene-acrylic acid copolymer or polyvinylidene chloride.

It is an object of the invention to provide a thermoplastic film having at least three layers, including a seal layer, which is sealable to itself and other surfaces but which permits separation of the seal layer from at least one other layer of the film.

It is a feature of the invention to have a separable layer positioned to permit separation of the sealing layer from at least one other layer of the film.

It is an advantage of the invention that when a multilayer film comprising an inner layer and a sealing layer is sealed to itself, or another surface, the sealing layer can be separated from the other layers of the film.

DETAILED DESCRIPTION OF THE INVENTION

The invention relates to a sealable film comprising
(a) an inner layer comprising an olefin polymer;
(b) a sealing layer, typically a skin layer, on at least one side of the inner layer; and
(c) a separable layer positioned between the inner layer and the sealing layer, the separable layer comprising (1) an ethylene-propylene copolymer, specifically a block copolymer or (2) a blend of polyethylene and as an olefin which forms an incompatible blend or mixture with the polyethylene either (i) a polypropylene homopolymer or (ii) an ethylene-propylene copolymer, specifically a block copolymer. The polymers can be produced by any catalytic technique known in the art, e.g. Ziegler-Natta catalysis, metallocene catalysis, etc.

The inclusion of a separable layer between an inner layer and a sealable layer provides a sealable film which permits peeling of the inner layer from the sealable layer without substantially destroying either the inner or the sealable layers.

The separable layer consists of, typically, a material which, in combination with the sealable and inner layers of the film, provider a weak bond between itself and the inner layer and/or the sealable layer so that stress applied to the sealed film promotes destruction of the material of the separable layer and not the sealable or the inner layers. In another embodiment, the separable layer has less cohesive strength than either the sealable layer or the inner layer which causes the separable layer to give way before either the sealable layer or the inner layer. The term "peel material" is used herein to cover the class of film layer forming materials included in the separable layer that allow the sealing layer and inner layer of a composite film to be separated from each other under stress as essentially integral layers.

Usually, the peel material comprises at least one olefin polymer. Examples of the peel material include those olefin polymers selected from the group consisting of an ethylene-propylene block copolymer or a blend of various kinds of polyethylene and another olefin which forms an incompatible blend or mixture with the polyethylene, specifically either (i) a polypropylene homopolymer or (ii) an ethylene-propylene block copolymer. Typically, the polyethylene is selected from the group consisting of low density polyethylene, high density polyethylene, linear low density polyethylene, medium density polyethylene, metallocene-catalyzed versions of these polyethylenes and blends thereof. The term polyethylene includes homo-, co- or terpolymers which include ethylene. Comonomers can be C$_3$–C$_8$ olefins. A suitable ultra low density polyethylene produced by metallocene catalysts can be defined as having a density in the range of about 0.88 g/cm$^3$ to about 0.915 g/cm$^3$, a melt index in the range of about 1.5 dg/min to about 7.5 dg/min, and a melting point in the range of about 60° C. to about 115° C., measured as DSC peak T$_m$.

Any layer of the film can include a propylene homopolymer component, the propylene homopolymer can be predominantly isotactic, syndiotactic or atactic and can include a blend of any of the foregoing forms of propylene homopolymer. Usually the (c)(2) separable layer comprises about 70 to 80 wt % isotactic polypropylene or about 70 to 80 wt % syndiotactic polypropylene based upon the entire weight of the olefin polymer of the separable layer.

Specific examples of commercially available materials which comprise the peel material are ethylene-propylene block copolymer sold by Himont as "8523"; linear low density polyethylene sold by Exxon as "LL3001"; a metallocene catalyzed plastomer ethylene-hexene copolymer sold by Exxon as "SLP 9045"; high density polyethylene sold by Oxychem as "M6211"; linear low density polyethylene sold by Chevron as "PE1019" and a metallocene catalyzed polyethylene sold by Exxon as "2009", and a propylene homopolymer sold by Fina Oil and Chemical Company as "3371." The ethylene-propylene block copolymer sold by Himont as "8523" is an example of a material that can function unblended as a separable layer.

The low density polyethylene can be defined by ethylene polymers having a density in the range of about 0.91 to 0.925 g/cm$^3$. The high density polyethylene can be defined by ethylene polymers having a density in the range of about 0.941 to 0.965 g/cm$^3$ and even higher. The medium density polyethylene can be defined by ethylene polymers having a density in the range of about 0.926 to about 0.940 g/cm$^3$.

The proportion of polyethylene in blends of the separable layer of (c)(2) varies over a wide range. Typically, this layer comprises polyethylene in an amount ranging from about 20 to about 80 wt %, based on the entire weight of the olefin polymer of the separable layer. More typically, the amount of polyethylene ranges from about 30 to about 70 wt % based on the entire weight of the olefin polymer of the separable layer.

When the separable layer is ethylene-propylene block copolymer, the copolymer comprises about 3 to about 25 wt. % ethylene, based on the entire weight of the copolymer. The term "block" copolymer is used in the ordinary sense meaning a polymer whose molecule is made up of alternating sections of ethylene or polyethylene separated by sections of a different olefin such as propylene or polypropylene.

In one aspect of the invention, the separable layer is a blend of ethylene homopolymer or copolymer and another olefin homo- or co-polymer. In this aspect, the separable layer combination is, typically selected from, but not limited to, the group consisting of (a) a blend of linear low density polyethylene and polypropylene; (b) blend of high density polyethylene and polypropylene; (c) a blend of low density polyethylene and polypropylene; (d) a blend of metallocene catalyzed polyethylene and polypropylene; and (e) a blend of linear low density polyethylene and ethylene-propylene block copolymer. Any proportion of the two polymers is appropriate but choice of the blend proportion may be made to meet optical clarity objectives through routine experimentation.

The film structure includes an inner layer which is the innermost part of the film structure. The inner layer can be a single layer or a plurality of layers. Typically there is a core layer and one or more intermediate layers located next to the core, e.g. between the core layer and the separable layer. The inner layer, typically, comprises an olefin polymer such as polypropylene or polyethylene. In general, the polypropylene of the inner layer is predominantly isotactic, syndiotactic or atactic. However, it can comprise greater than about 80 wt. % of isotactic polypropylene based on the entire weight of the polypropylene of the inner layer or greater than about 80 wt. % of syndiotactic polypropylene, based on the entire weight of the polypropylene of the inner layer.

When the inner layer comprises polyethylene, the polyethylene is, typically, high density polyethylene. The term high density polyethylene generally includes polyethylenes ranging in density from about 0.94 to about 0.96 and over. A useful commercially available high density polyethylene is sold by Oxychem as "M6211".

The inner layer can also comprise an ethylene co- or ter-polymer in which the remaining monomer constituent is a $C_3$ to $C_4$ monomer such as propylene and/or butene-1. A useful ethylene copolymer is an ethylene-propylene block copolymer which is commercially available from Himont as "8523".

The intermediate layer can include any olefin polymer material. Any material used in the core layer is especially appropriate. Typically, however, the intermediate layer is propylene homopolymer.

The inner layer can be clear or opaque.

The sealing layer is applied on the separable layer side of the film. The materials of the sealing layer are characterized by features which permit the separable layer to separate away when stress is applied to the film. Typical examples of materials which are suitable for use as the sealing layer are coextrudable materials which form a seal upon application of elevated temperatures and, at least slight, pressure. Examples of thermoplastic materials which can be used for the sealing layer include olefinic homo-, co- or terpolymers. The olefinic monomers can comprise 2 to 8 carbon atoms. Specific examples include ethylene-propylene random copolymer, ethylene-butene-1 copolymer, ethylene-propylene-butene-1 terpolymer, propylenebutene copolymer, low density polyethylene, linear low density polyethylene, very low density polyethylene, metallocene-catalyzed polyethylene, metallocene-catalyzed polymers known by the term plastomer, metallocene-catalyzed ethylene-hexene copolymer, metallocene-catalyzed, ethylene-butene copolymer, metallocene-catalyzed ethylene-octene copolymer, ethylene-methacrylic acid copolymer, ethylene-vinyl acetate copolymer and ionomer resin. A blend of the foregoing materials is also contemplated such as a blend of the plastomer and ethylene-butene copolymer.

The metallocene-catalyzed ethylene homo-, co- or ter-polymers of the sealing layer can be of the same type as that of the separable layer provided that both layers are different and have separability.

A coating can be applied to the seal layer which facilitates sealing of the film to itself or to another film surface. Examples of suitable coatings include acrylic, polyvinylidene chloride, or ethylene-acrylic acid copolymer, among others.

The invention is also directed to a method of making a sealable film comprising the steps of (a) providing an inner olefin layer; (b) coextruding the inner olefin layer with a separable layer, the separable layer comprising at least one olefin polymer selected from the group consisting of an (1) ethylene-propylene block copolymer or (2) a blend of polyethylene and another olefin which is incompatible with the polyethylene, specifically, either (i) a polypropylene homopolymer or (ii) an ethylene-propylene copolymer; and (c) applying a sealable layer to a surface of the separable layer. This method can further comprise the step of coating the outer layer with a coating composition selected from the group consisting of acrylic, polyvinylidene chloride, and ethylene-acrylic acid polymers.

The thickness of the separable layer can be important. In general, depending upon the material of the separable layer, the separable layer can constitute at least about 20%, preferably about 30% to about 50% of the entire thickness of the film. For example, in a film of about 10 $\mu$m to about 80 $\mu$m, specifically about 15 µm to about 35 µm, and when the separable layer is, for example, ethylene block copolymer or a blend of ethylene polymer and polypropylene, the separable layer should range from about 5 µm to about 15 µm, specifically about 7 µm to about 121 µm.

One or more of the layers of the film, but typically an exposed surface layer, can include a small amount of a finely divided inorganic material which can impart antiblock characteristics to the structure and reduce the coefficient of friction. Contemplated finely divided inorganic materials include synthetic amorphous silica, such as silica, diatomaceous earth and clay. An effective amount of a slip agent can be employed. A typical slip agent is selected from the group consisting of particulate crosslinked hydrocarbyl-substituted polysiloxanes.

The resins of this invention are formed into multilayer films using film forming technology that is well known to those skilled in the art. The resins are, typically cast extruded or coextruded into a film using a flat die or blown extruded or coextruded using a tubular die. The films are then, usually, oriented either uniaxially or biaxially by known stretching techniques. The sealable layer can be applied by coextrusion or extrusion coating. In one embodiment of the invention, after orienting the film in the machine direction the sealable layer is extrusion coated onto the separable layer followed by orienting the film in the transverse direction.

EXAMPLES

In each of these examples, coextruded biaxially oriented films were produced using the olefinic polymer resins described below. The films were multilayer coextruded films made by melting the polymers, at a temperature ranging from about 245 to about 290° C., extruding the polymers through a slot die in sheet form and then orienting the film sequentially in the machine direction (about 3 to about 8 times, at about 100° C.) and in the transverse direction (about 5 to about 12 times, at about 160° C.).

In the examples which follow films were sealed by the sealable layer. The performance of the separable layer was tested by trying to pull the seal apart. In each of the examples the tester was able to separate the seal without severing the film indicating effective performance of the separable layer.

Sealability was tested on the films to confirm that the separable layer did not adversely impact sealability or seal strength. Seal strength was evaluated to determine the sealability of the film. In the examples, the minimum seal temperature was determined using a Wrap-Aide Crimp Sealer Model J or K. In the test method, the crimp sealer is set to a dial pressure of about 20 psi (138 kPa), dwell time of 0.75 seconds. A film specimen is prepared so that when two surfaces are placed together the resulting film is approximately 6.35 cm in the transverse direction by 7.62 cm in the machine direction. The specimen is then inserted squarely, smoothly and flatly into the crimp sealer jaws so that a small amount protrudes beyond the back end of the jaws. The transverse direction of the film is parallel to the sealer jaws. The jaws are closed and immediately after the sealing bar rises the specimen is removed from the jaws of the sealer. A JDC cutter is used to cut the film into a one inch strip. The amount of force needed to separate the seal is determined on an Alfred-Suter crimp seal strength testing unit. The amount of force needed to pull the seal apart is recorded in N/m. In order to determine the minimum temperature required to form a seal requiring about 77.03 N/m peel force, the crimp seals are formed at temperatures raised by 2.8 degree centigrade increments until one temperature yields a seal value of less then about 77.03 N/m and the next temperature yields a seal value of greater than or equal to about 77.03 N/m.

A chart method (using an established chart) for 77.03 N/m minimum seal temperature (MST) is used or a calculation is used. In the calculation method the following equation is employed:

$$[\{(77.03 \text{ N/m} - V1) \div (V2 - V1)\} \times (2.8)] + T1 = MST \text{ in } °C.;$$

where

V1=seal value obtained prior to achieving 77.03 N/m

V2=seal value obtained subsequent to achieving 77.03 N/m 2.8=2.8 degree C increment in seal temperature T1=temperature prior to achieving 77.03 N/m.

The seal strength, in some of the examples, was tested by contacting the seal surfaces and forming a seal at 210° F. (99° C.), 2 second dwell time and 5 psi (34 kPa) in an ASKO sealer, then testing seal strength by measuring the force in grin required to pull the sealed films apart in an Instron testing machine.

For packaging film applications, film without a separable layer is usually torn through to open the package, especially when the area where the film is sealed is stronger than the film. With the separable layer, the bag can be opened without tearing the film because in the area where the package film is sealed to enclose the contents of the package, there is a separable layer which permits the seal to be separated without film tearing. An advantage of the separable layer is that it permits ordinary seal materials to be used to seal the film so that the desired properties of a seal material, such as seal strength and hot tack, are not compromised but the film is still peelable.

Example I

The films of each of these examples were coextruded oriented films having a separable layer of ethylene-propylene block copolymer (Himont's 8523). The thickness of each layer in microns is indicated below.

Film 1

Core Layer: propylene homopolymer (Fina 3371), 15 µm

Separable Layer: ethylene-propylene block copolymer (Himont 8523), 8 µm

Seal Layer: ethylene-propylene-butene-1 terpolymer (Chisso 7820), 3 µm

Film 2

Core Layer: propylene homopolymer (Fina 3371), 15 µm

Separable Layer: ethylene-propylene block copolymer (Himont 8523), 8 µm

Seal Layer: propylene-butene random copolymer (Shell SRD4-141), 3 µm

Film 3

Core Layer: propylene homopolymer (Fina 3371), 20 µm

Separable Layer: ethylene-propylene block copolymer (Himont 8523), 8 µm

Seal Layer: metallocene catalyzed ethylene-butene copolymer (Exact 3025 available commercially from Exxon Chemical Co.), 3 µm Film 4

Core Layer: propylene homopolymer (Fina 3371), 20 µm

Separable Layer: ethylene-propylene block copolymer (Himont 8523), 8 µm

Seal Layer: ethylene-methylacrylate copolymer (Optema TC020 available commercially from Exxon Chemical Co.), 3 µm Film 5
Skin Layer: high density polyethylene (Oxychem M6211), 2 μm
Core Layer: propylene homopolymer (Fina 3371), 11 μm
Separable Layer: ethylene-propylene block copolymer (Himont 8523), 5 μm
Seal Layer: metallocene catalyzed ethylene-hexene copolymer (Exact 3024), 5 μm In Film 5, after machine direction orientation, the seal layer was extrusion coated onto the surface of the Separable layer followed by orienting in the transverse direction.

Film 6
Skin Layer: high density polyethylene (Oxychem M6211), 2 μm
Core Layer: propylene homopolymer (Fina 3371), 11 μm
Separable Layer: ethylene-propylene block copolymer (Himont 8523), 5 μm
Seal Layer: metallocene catalyzed plastomer of ethylene-hexene copolymer (SLP 9045, available commercially from Exxon Chemical Co.), 5 μm.

In Film 6, after machine direction orientation, the seal layer was extrusion coated onto the surface of the Separable layer followed by orienting in the transverse direction.

Film 7
Core Layer: ethylene-propylene block copolymer (Himont 8523); 12.7 μm
Separable layer: ethylene-propylene block copolymer (Himont 8523); 6.35 μm
Seal layer: linear low density polyethylene (Exxon LL 3001); 4 μm

| Temp °F. (°C.) Film No. | Crimp Seal Strength, g/in (g/cm) | | | | |
|---|---|---|---|---|---|
| | 210° F. (98° C.) | 220° F. (104° C.) | 230° F. (110° C.) | 250° F. (121°C.) | 270° F. (132° C.) |
| 1 | 500 (197) | 700 (276) | 805 (317) | 890 (356) | 845 (333) |
| 2 | — | 275 (108) | 575 (226) | 800 (315) | 850 (335) |
| 3 | 670 (264) | 785 (309) | 815 (321) | 850 (335) | 860 (339) |
| 4 | 475 (187) | 545 (215) | 570 (224) | 655 (258) | 700 (276) |
| 5 | 1650 (650) | 1500 (591) | 1500 (591) | 1450 (571) | 1450 (571) |
| 6 | 1650 (650) | 1750 (689) | 1750 (689) | 1700 (669) | 1850 (728) |
| 7* | 60 (24) | 140 (55) | 180 (71) | 370 (146) | 530 (209) |

*ASKO seal strength

Example II

The films of each of these examples were coextruded oriented films having a separable layer which was a blend of propylene homopolymer (Fina 3371) and an ethylene homo- or co-polymer. The proportion of each component of the blend and the thickness of each layer in microns is indicated below.

Film 8
Core Layer: propylene homopolymer (Fina 3371), 18 μm
Separable Layer: blend of 30% propylene homopolymer (Fina 3371) and 70% linear low density polyethylene (Exxon LL3001), 8 μm.
Seal Layer: ethylene-propylene-butene-1 terpolymer, (Chisso 7820) 3 μm Film 9
Core Layer: propylene homopolymer (Fina 3371), 13 μm
Separable Layer: blend of 30% propylene homopolymer (Fina 3371) and 70% linear low density polyethylene (Exxon LL3001), 8 μm
Seal Layer: metallocene catalyzed ethylene-hexene copolymer (Exact 3025), 4 μm. An acrylic coating was applied to the surface of the seal layer.

Film 10
Core Layer: propylene homopolymer (Fina 3371), 13 μm
Separable Layer: blend of 79% propylene homopolymer (Fina 3371) and 21% low density polyethylene (Chevron PE1017), 4 μm
Seal Layer: ethylene-propylene-butene-1 terpolymer (Chisso 7820), 4 μm.

| Temp °F. (°C.) Film No. | Crimp Seal Strength, g/in (g/cm) | | | | |
|---|---|---|---|---|---|
| | 210° F. (98° C.) | 220° F. (104° C.) | 230° F. (110° C.) | 250° F. (121°C.) | 270° F. (132° C.) |
| 8 | 1250 (492) | 1300 (512) | 1500 (591) | 1450 (630) | 1750 (689) |
| 9* | 60 (24) | 140 (55) | 230 (90) | 400 (157) | 520 (205) |
| 10 | 500 (197) | 890 (350) | 950 (374) | 1090 (429) | — |

*Seal strength tested in ASKO sealer

Example III

In this example, the film comprised a separable layer which was made from a blend of linear low density polyethylene and ethylene-propylene block copolymer.

Film 11
Core Layer: propylene homopolymer (Fina 3371), 13 μm
Separable Layer: blend of 50% linear low density polyethylene (Exxon LL3001) and 50% ethylene-propylene block copolymer (Himont 8523), 8 μm
Seal Layer: ethylene-propylene-butene-1 terpolymer (Chisso 7820), 3 μm.

| Temp °F. (°C.) Film No. | Crimp Seal Strength, g/in (g/cm) | | | | |
|---|---|---|---|---|---|
| | 210° F. (98° C.) | 220° F. (104° C.) | 230° F. (110° C.) | 250° F. (121°C.) | 270° F. (132° C.) |
| 11 | 1050 (413) | — | 1300 (512) | 1600 (630) | 2700 (669) |

Example IV

Each of the films of this example, were five layer structures having a core propylene homopolymer layer (Fina 3371), a separable layer on either side of the core layer which was made from a blend of propylene homopolymer and metallocene catalyzed polyethylene in the proportions indicated below and a sealable layer on the surface of the separable layer.

Film 12
Core Layer: propylene homopolymer, 25 μm
Separable Layers: 50% metallocene catalyzed polyethylene (Exxon 2009) and 50% propylene homopolymer (Fina 3371), 2.5 μm
Seal Layers: metallocene catalyzed polyethylene (Exxon 2009) and Tospearl slip agent (1600 ppm)

Film 13
Core Layer: propylene homopolymer, 25 μm
Separable Layers: 50% metallocene catalyzed polyethylene (Exxon 2009) and 50% propylene homopolymer (Fina 3371), 2.5 μm
Seal Layers: propylene-ethylene-butene-1 terpolymer (Chisso 7702), 1 μm Film 14
Core Layer: propylene homopolymer, 10 μm
Separable Layers: 50% metallocene catalyzed polyethylene (Exxon 2009) and 50% propylene homopolymer (Fina 3371), 10 μm
Seal Layers: ethylene-propylene-butene-1 terpolymer (Chisso 7820), 1 μm Film 15
Core Layer: propylene homopolymer, 10 μm
Separable Layers: 35% metallocene catalyzed polyethylene (Exxon 2009) and 65% propylene homopolymer (Fina 3371), 10 μm
Seal Layers: ethylene-propylene-butene-1 terpolymer (Chisso 7820), 1 μm Film 16
Core Layer: propylene homopolymer, 10 μm
Separable Layers: 20% metallocene catalyzed polyethylene (Exxon 2009) and 80% propylene homopolymer (Fina 3371), 10 μm
Seal Layers: ethylene-propylene-butene-1 terpolymer (Chisso 7820), 1 μm Film 17
For comparison, a film was prepared substantially as described in Example 15 except that the layer between the core layer and the seal layer was 100% propylene homopolymer. This film demonstrated comparable sealability but was not peelable.

What is claimed is:

1. An oriented sealable film comprising:
  (a) an inner layer comprising an olefin polymer which comprises polypropylene, high density polyethylene or ethylene-propylene copolymer or terpolymer, wherein the polypropylene comprises greater than about 80 wt % of isotactic polypropylene or greater than about 80 wt % of syndiotactic polypropylene, wherein the percentages are based on the entire weight of the polypropylene of the inner layer;
  (b) a sealing layer selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed ethylene-hexene copolymer, metallocene catalyzed ethylene-butene copolymer, metallocene catalyzed ethylene-octene copolymer, ethylene-methacrylate copolymer, ethylene-vinyl acetate copolymer and ionomer resin; and
  (c) a separable layer positioned between the inner layer and the sealing layer, the separable layer comprising a blend of (i) ethylene-propylene block copolymer and (ii) metallocene catalyzed ethylene-α-olefin copolymer, wherein the α-olefin is $C_3$–$C_8$ olefin.

2. An oriented sealable film comprising:
  (a) an inner layer comprising an olefin polymer which comprises polypropylene, high density polyethylene or ethylene-propylene copolymer or terpolymer, wherein the polypropylene comprises greater than about 80 wt % of isotactic polypropylene or greater than about 80 wt % of syndiotactic polypropylene, wherein the percentages are based on the entire weight of the polypropylene of the inner layer;
  (b) a sealing layer selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed ethylene-hexene copolymer, metallocene catalyzed ethylene-butene copolymer, metallocene catalyzed ethylene-octene copolymer, ethylene-methacrylate copolymer, ethylene-vinyl acetate copolymer and ionomer resin; and
  (c) a separable layer positioned between the inner layer and the sealing layer, the separable layer comprising a blend of (i) ethylene-propylene block copolymer and (ii) ultra low density polyethylene.

3. An oriented sealable film comprising:
  (a) an inner layer comprising an olefin polymer which comprises polypropylene, high density polyethylene or ethylene-propylene copolymer or terpolymer, wherein the polypropylene comprises greater than about 80 wt % of isotactic polypropylene or greater than about 80 wt % of syndiotactic polypropylene, wherein the percentages are based on the entire weight of the polypropylene of the inner layer;
  (b) a sealing layer selected from the group consisting of ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed ethylene-hexene copolymer, metallocene catalyzed ethylene-butene copolymer, metallocene catalyzed ethylene-octene copolymer, ethylene-methacrylate copolymer, ethylene-vinyl acetate copolymer and ionomer resin; and
  (c) a separable layer positioned between the inner layer and the sealing layer, the separable layer comprising a blend of (i) propylene homopolymer and (ii) metallocene catalyzed polyethylene.

4. The oriented sealable film according claim 1 or claim 2, wherein the ethylene-propylene block copolymer comprises from about 3 to about 25 wt % of ethylene based on the entire weight of the block copolymer.

5. The oriented sealable film according to any one of claims 1, 2, or 3, wherein the separable layer constitutes at least about 20% of the entire thickness of the film.

6. The oriented sealable film according to any one of claims 1, 2, or 3, wherein one or more of the layers of the film further comprises a finely divided inorganic material selected from the group consisting of synthetic amorphous silica, diatomaceous earth, and clay.

7. The oriented sealable film according to any one of claims 1, 2, or 3, wherein one or more of the layers of the film further comprises a crosslinked hydrocarbyl substituted polysiloxane.

* * * * *